United States Patent
Mizushima et al.

(10) Patent No.: US 6,656,559 B2
(45) Date of Patent: Dec. 2, 2003

(54) OPTICAL RECORDING MEDIUM AND OPTICAL RECORDING METHOD THEREFOR

(75) Inventors: Tetsuro Mizushima, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 91 days.

(21) Appl. No.: 09/968,530

(22) Filed: Oct. 2, 2001

(65) Prior Publication Data

US 2002/0039634 A1 Apr. 4, 2002

(30) Foreign Application Priority Data

Oct. 3, 2000 (JP) .......................... 2000-303673

(51) Int. Cl.$^7$ ................................. B32B 3/02
(52) U.S. Cl. .................... 428/64.1; 428/64.5; 428/64.6; 430/270.13
(58) Field of Search ............... 428/64.1, 64.4, 428/64.5, 64.6, 913; 430/270.13, 495.1, 945; 369/283, 288

(56) References Cited

U.S. PATENT DOCUMENTS

| 6,096,399 A | * | 8/2000 | Yoshinari | 428/64.1 |
| 6,296,915 B1 | * | 10/2001 | Yusu | 428/64.1 |
| 6,312,780 B1 | * | 11/2001 | Kasami | 428/64.1 |
| 6,479,121 B1 | * | 11/2002 | Miura | 428/64.1 |
| 2002/0033991 A1 | * | 10/2002 | Zhou | 430/270.13 |

FOREIGN PATENT DOCUMENTS

| JP | 1-92937 | 4/1989 |
| JP | 5-342629 | 12/1993 |
| JP | 6-195747 | 7/1994 |
| JP | 9-66668 | 3/1997 |
| JP | 10-226173 | 8/1998 |
| JP | 11-73692 | 3/1999 |
| JP | 11-185289 | 7/1999 |
| JP | 2000-149322 | 5/2000 |
| WO | WO 98/47142 | 10/1998 |

OTHER PUBLICATIONS

U.S. patent application Ser. No. 09/968,548, filed Oct. 02, 2001, pending.

U.S. patent application Ser. No. 09/968,530, filed Oct. 02, 2001, pending.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

A write once medium having a phase change recording layer is provided. In this medium, stable recorded state and high crystallizability of the recording layer are simultaneously realized. The optical recording medium has a recording layer 4 comprising at least one phase change layer 41 and at least one functional layer 42 in contact with the phase change layer. The component constituting the phase change layer 41 and the component constituting the functional layer 42 undergoes a reaction to produce a reaction product when the phase change layer 41 is heated to a temperature equal to or higher than the melting point of the phase change layer 41, and the area where the reaction product has formed experiences decrease in its optical reflectivity, and the optical reflectivity after such decrease is maintained even if the area wherein the reaction product has formed is heated to the crystallization temperature of the phase change layer.

13 Claims, 6 Drawing Sheets

LASER BEAM

LASER BEAM

OPTICAL RECORDING MEDIUM AND OPTICAL RECORDING METHOD THEREFOR

BACKGROUND OF THE INVENTION

This invention relates to an optical recording medium having a phase change layer and a method for recording information in such medium.

Highlight is recently focused on optical recording media capable of recording information at a high density. Typical optical recording mediums include write once media which can be recorded only once and which can not be rewritten, and rewritable media wherein repeated rewriting has been enabled. Improvement in the recording density and increase in the data transmission rate are always required for an optical recording medium.

Write once media are unrewritable media which are adapted for use in documents wherein tampering of the information recorded therein may cause a serious problem as in the case of official documents. The most widely employed write once media are those using an organic dye for the recording material. Use of an organic dye, however, is associated with the difficulty of realizing a high transfer rate since recording sensitivity is likely to be insufficient when the recording is accomplished at a high speed by increasing the linear velocity of the medium. An organic dye also has relatively steep absorption spectrum and reflection spectrum, and a careful choice of the organic dye is required so that the organic dye chosen corresponds to the recording/ reading wavelength. For example, when there is a high-end format which requires use of a recording/reading beam of shorter wavelength, a problem may arise that the medium of low-end format can not be recorded/read by the recording/ reading beam adopted in the high-end format. There may also arise the problem that dyes corresponding to the recording/reading of shorter wavelength are difficult to design and purchase.

On the other hand, there are rewritable recording media of phase change type wherein the medium is recorded by changing the crystalline state of the recording layer by irradiating a laser beam, and read by detecting the change in the reflectivity induced in the recording layer by such change in the crystalline state.

In the phase change medium which can be rewritten by overwriting, amorphous record marks are formed by irradiating the medium with a laser beam of recording power level to melt the crystalline recording layer and quenching the molten recording layer to thereby form the amorphous record marks. In the erasure, the medium is irradiated with a laser beam of erasing power level to heat the recording layer to a temperature of not less than the crystallization temperature and less than the melting temperature followed by gradual cooling to thereby crystallize the amorphous record marks. Accordingly, the overwriting can be accomplished by irradiating a single laser beam with its intensity modulated. In the recording of such phase change medium at a high speed, the rate determining factor is crystallization speed of the recording layer, namely, the transformation speed from the amorphous to the crystalline phase. High speed recording can be realized by using a recording layer which crystallizes at a high speed while crystallization at an excessively high speed is likely to invite crystallization of the amorphous record marks, namely, destabilization of the record marks to adversely affect durability in the reading as well as storage stability. An excessively high crystallization speed may also invite the phenomenon of selferase wherein the record marks partly become recrystallized in the recording due to the heat conduction in in-plane direction as well as crosserase wherein record marks on the adjacent track are erased in the recording. As described above, it is difficult in a rewritable phase change medium to drastically increase the crystallization speed of the recording layer, and hence, remarkably increase the data transfer rate.

When a phase change medium is used as a write once medium, erasure (crystallization) is no longer required. When such medium is recorded at a high speed by increasing the linear velocity of the medium, increase in the crystallization speed of the recording layer in accordance with the increase in the linear velocity is unnecessary, and the problems as described above such as adverse effects on the storage reliability are alleviated. However, initialization of the recording layer will be difficult if the crystallization speed of the recording layer is excessively reduced for the purpose of increasing the storage reliability. The as-deposited phase change layer is generally amorphous, while the record marks formed by melting and quenching the crystalline recording layer are also amorphous. While both the as-deposited phase change layer and the record marks are amorphous, the stability of the amorphous phase is higher in the case of the as-deposited recording layer compared to the record marks. As a consequence, in the case of the overwriting of a phase change medium immediately after its production, crystallization of the area that has been irradiated with the laser beam of erasing power level is associated with difficulty. This is the reason why initialization (crystallization of the entire surface) is required before the overwriting. Difficulty in the initialization will invite increase of the production cost since a laser beam of high power is required and the medium can not be initialized at a high speed.

Also known in addition to those as described above are the write once media of the type wherein crystalline record marks are formed on the as-deposited recording layer, namely, on the as-deposited amorphous recording layer. In the medium of this type, the recorded medium has crystalline record marks formed in the amorphous recording layer, and the recorded state will be unstable if the stability of the amorphous phase is insufficient. However, when the stability of the amorphous phase is improved by reducing the crystallization speed, formation of the record marks will become difficult due to the difficulty of the crystallization. The medium of this type also suffers from the problem of difficulty in tracking servo in the recording since the amorphous recording layer of low reflectivity is irradiated with the recording laser beam.

Various proposals have been made to facilitate crystallization of the as-deposited amorphous recording layer or to speed up the erasure of the record marks. Proposals include provision of a layer in contact with the recording layer for promoting the crystallization of the recording layer, and constitution of the recording layer from a laminate of layers.

For example, Japanese Patent Application No. (JP-A) 92937/1989 discloses an optical recording medium comprising a recording layer containing Te or Se as its main component and a crystal nucleus-forming layer in contact with the recording layer, wherein apparent speed of nuclei formation near the melting point has been increased. There is also disclosed that the increase in the apparent nuclei formation speed of the recording layer enables erasure of the record marks at a higher speed. In claim 4 of JP-A 92937/ 1989, there is described that the crystal nucleus-forming layer is amorphous immediately after the production of the optical recording medium, and once crystallized by laser beam irradiation, the layer never becomes amorphous or immediately crystallized upon irradiation with the laser beam. In other words, the stable phase for this crystal nucleus-forming layer is the crystalline phase once the layer has been crystallized even if the layer went through repeated recording and erasing operations. JP-A 92937/1989 also describes that it is preferable that the crystalline phase of the crystal nucleus-forming layer after its crystallization is the same as the crystalline phase of the recording layer. Examples of JP-A 92937/1989 disclose combination of the recording layer comprising $Te_{57}In_{18}Au_{25}$ and the crystal nucleus-forming layer comprising $Te_{67}Au_{33}$.

WO98/47142 discloses an optical information recording medium wherein a crystallization-promoting layer is provided in contact with the recording layer comprising a Ge—Sb—Te-based alloy. This crystallization-promoting layer has a crystal structure of face centered cubic lattice which is the same as that of the recording layer, or a rhombohedral lattice which does not include Te. Initialization (crystallization) of the recording layer is not required in this medium since the recording layer is crystallized at the time of its formation owing to the provision of the crystallization-promoting layer and the recording layer in contact with each other. There is disclosed that the adjacent crystallization-promoting layer and recording layer turns out to be in mixed state. In Examples of WO98/47142, the recording layer comprises a composition based on $Ge_2Sb_2Te_5$, and the crystallization-promoting layer contains PbTe, $Bi_2Te_3$, Sb, or Bi. In Comparative Examples, the crystallization-promoting layer contains W (body centered cubic lattice), Te (hexagonal system), $Sb_2TeSe_2$ (rhombohedral lattice), $Sb_2Te_3$ (rhombohedral lattice), $Ag_2Te$ (monoclinic system), or CrTe (hexagonal system).

JP-A 185289/1999 discloses a write once optical information-recording medium which has a phase change recording layer on at least one surface of the substrate, and a layer comprising a semiconductor material immediately on and/or under the recording layer. In this medium, when the recording layer is crystallized, the shape of the unit cell constituting the crystal face parallel to the substrate in the recording layer matches with the shape of the unit cell constituting the most dense face of the semiconductor material layer. The invention described in JP-A 185289/1999 attempts to reduce the jitter by providing such semiconductor material layer, and adequately selecting the material used for each layer so that absolute value of the lattice mismatch between the recording layer and the semiconductor material layer does not exceed 10%. JP-A 185289/1999 does not explicitly indicate the crystallization-promoting effect realized by providing the semiconductor material layer in contact with the recording layer. JP-A 185289/1999, however, describes that it has been estimated that, when the recording layer had been crystallized, deformation of the lattice that takes place at the boundary with the adjacent layer prevents crystallization, and hence, invites increase in the jitter. The compounds indicated in JP-A 185289/1999 as exemplary compounds for use in the semiconductor material layer include BaO, AgCl, BeTe, GaAs, AlAs, YSb, YP, ZnSe, ThS, SnAs, YSe, AgBr, ThP, LaS, ScSb, ThSe, CaSe, PbS, ScBi, ThAs, BiSe, InAs, YTe, GaSb, PbSe, SnSb, AlSb, CuI, SrSe, SnTe, ThSb, CaTe, BaS, LaTe, PbTe, BiTe, SrTe, AgI, InSb, CdTe, $Sb_2Te_3$, $Bi_2Se_3$, and $Bi_2Te_3$. The materials indicated for use in the recording layer include alloys containing at least one of Te, Sb and Se, among which Te—Ge—Sb alloys and In—Sb—Te—Ag alloys being indicated as the most preferable. The In—Sb—Te—Ag alloy used in the Examples is $Ag_{2.6}In_{3.7}Sb_{64.2}Te_{29.5}$. In the medium described in JP-A 185289/1999, crystalline pits (record marks) are formed in the amorphous recording layer. It should be noted that, unlike the WO98/47142, JP-A 185289/1999 does not explicitly refer to the state of the semiconductor material layer after completion of the medium. JP-A 185289/1999, however, discloses that it is not the interdiffusion between the recording layer and the compound semiconductor layer that takes place.

JP-A 226173/1998 discloses an optical recording medium which has a recording layer comprising a laminate of a Sb-based thin layer containing Sb as its main component and a reactive thin layer containing In, Ag and Te (and optional Sb) as its main components or Ge and Te (and optional Sb) as its main components, and wherein the mixing of both thin layers generates a phase change material. In this medium, the treatment of mixing both thin layers is generally conducted after forming the recording layer by continuously irradiating the layer with a laser beam. In the area where the layers have been mixed, the amorphous phase such Ag—Sb—Te phase is dispersed in the Sb crystalline phase, and the reflectively is lower than that before the mixing but higher than the amorphous region (record marks). The medium is overwritten after the mixing treatment by the procedure normally used in a phase change medium. In the region which has been irradiated with the laser beam of erasing power level, crystallization into $AgSbTe_2$ takes place to increase the reflectivity.

JP-A 73692/1999 discloses an optical recording medium which has a recording layer comprising a laminate of a Te-based thin layer containing Te as its main component and reactive thin layer containing Ge and/or Sb as its main component, and wherein the mixing of both thin layers generates a phase change material. In this medium, the treatment of mixing both thin layers is conducted after forming the recording layer by continuously irradiating the layer with a laser beam. In the area where the layers have been mixed, the amorphous phase such as Ge—Sb phase is dispersed in the Te crystalline phase, and the reflectively is lower than that before the mixing but higher than the amorphous region (record marks). The medium is overwritten after the mixing treatment by the procedure normally used in a phase change medium. In the region which has been irradiated with the laser beam of erasing power level, crystallization into $GeTe_2$ or $Sb_2Te_3$ takes place to increase the reflectivity.

JP-A 342629/1993 discloses an information recording medium wherein a high speed initialization has been enabled by providing an easily crystallizable auxiliary layer in contact with the recording layer comprising a phase change material. In this medium, the auxiliary layer has a composition containing at least 50 atom % of Se or at least 70 atom % of Te, and average composition of the auxiliary layer and the recording layer is $Ge_2Sb_2Te_5$, $GeSb_2Te_4$, or $In_3SbTe_2$. In other words, the auxiliary layer and the recording layer of this medium reacts with each other to thereby constitute a typical composition of the phase change material.

JP-A 66668/1997 discloses a write once optical disk wherein a first Sb—Se-based thin film layer, a Bi—Te-based thin film layer, and a second Sb—Se-based thin film layer are disposed one on another. This optical disk attempts to improve the recording sensitivity by using the composition which is somewhat different from the stoichiometrical composition for the first and second Sb—Se-based thin film layers. In this optical disk, reaction between the thin film layers is promoted by irradiating a laser beam to form a Bi—Te—Sb—Se-based quaternary alloy, and to thereby form record marks where the reflectivity has undergone a change.

In addition to the layers as described above, it is also known to use a non-metal layer for the purpose of promoting the crystallization of the amorphous phase change layer.

For example, JP-A 149322/2000 discloses a non-initialized phase change optical recording medium comprising a phase change layer and a crystallization-inducing layer provided in contact with the phase change layer. This crystallization-inducing layer is a crystalline light-transmitting layer. JP-A 149322/2000 discloses that overwriting of the as-deposited recording layer is enabled by the provision of the crystallization-inducing layer. JP-A 149322/2000 also indicates that, surface of a crystalline thin film generally functions as crystallization nuclei when the crystalline thin film is provided in contact with an amorphous thin film, and JP-A 149322/2000 makes use of such function. JP-A 149322/2000 indicates use of cerium oxide and zinc sulfide for the crystallization-inducing layer, and also, use of a ternary alloy comprising Ge, Sb and Te such as $Ge_2Sb_2Te_5$ or a ternary alloy comprising In, Sb and Te for the recording layer.

SPIE Vol. 3401, 24–32 and JP-A 195747/1994 disclose that crystallization speed of the phase change layer can be increased by providing a layer of germanium nitride or silicon nitride in contact with the phase change layer having the composition near $Ge_2Sb_2Te_5$.

SUMMARY OF THE INVENTION

An object of the present invention is to provide a write once medium having a phase change recording layer, which is stable in the recorded state and wherein crystallization of the recording layer is facilitated.

Such objects are attained by the present invention as described in (1) to (8), below.

(1) An optical recording medium having a recording layer comprising at least one phase change layer which can undergo amorphous-crystalline conversion and at least one functional layer in contact with the phase change layer, wherein the component constituting the phase change layer and the component constituting the functional layer undergoes a reaction to produce a reaction product when the phase change layer is heated to a temperature equal to or higher than the melting point of the phase change layer, wherein the area where the reaction product has formed experiences a change in its optical reflectivity, and the optical reflectivity after the change is maintained even if the area wherein the reaction product has formed is heated to the crystallization temperature of the phase change layer.

(2) An optical recording medium according to the above (1) wherein said reaction product is not crystalline; and the area where the reaction product has formed experiences decrease in its optical reflectivity; and the state of decreased optical reflectivity is maintained even if the area where the reaction product has formed is heated to the crystallization temperature of the phase change layer.

(3) An optical recording medium according to the above (1) or (2) wherein the functional layer has an extinction coefficient at the recording/reading wavelength of at least 1.5.

(4) An optical recording medium according to any one of the above (1) to (3) wherein said functional layer is a crystalline layer.

(5) An optical recording medium according to any one of the above (1) to (4) wherein the relation:

$$R_{cry} > R_{asd} > R_{rea}$$

is satisfied when the reflectivity of the medium is $R_{cry}$ in the crystalline area of the phase change layer; $R_{asd}$ in the amorphous area of the phase change layer; and $R_{rea}$ in the area where the reaction product has formed.

(6) An optical recording method for recording the optical recording medium of any one of the above (1) to (5) wherein the recording layer including the phase change layer in amorphous state is irradiated with a laser beam of modulated intensity so that record marks comprising the reaction product are formed, and so that at the same time, the phase change layer becomes crystallized in the area other than the record marks.

(7) An optical recording method for recording the optical recording medium of any one of the above (1) to (5) wherein the recording layer including the phase change layer in crystalline state is irradiated with a laser beam of modulated intensity so that record marks comprising the reaction product are formed, and so that at the same time, the phase change layer is maintained in its crystalline state in the area other than the record marks.

(8) An optical recording method for recording the optical recording medium of any one of the above (1) to (5) wherein the recording layer including the phase change layer in amorphous state is irradiated with a laser beam of modulated intensity so that first record marks comprising the reaction product are formed, and at the same time, second record marks are formed by crystallization of the phase change layer, and the phase change layer is maintained in its amorphous state in the area other than the first and the second record marks.

DETAILED DESCRIPTION OF THE INVENTION

Figure 1:
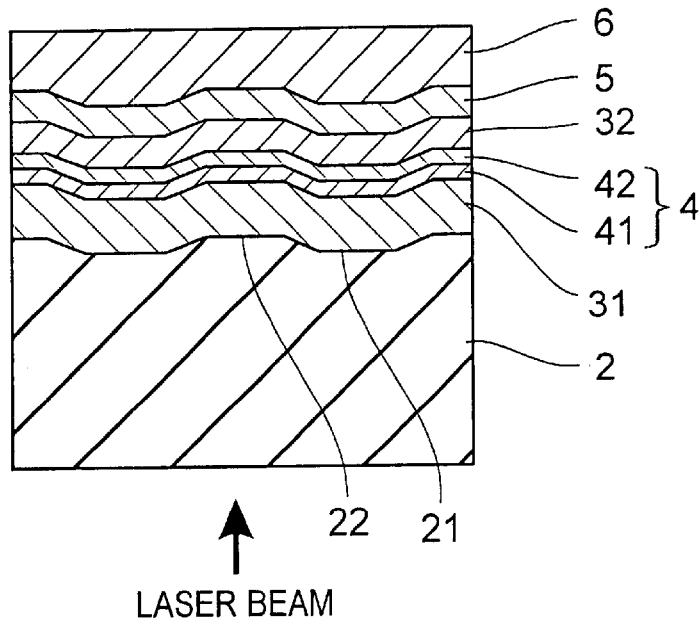
FIG. 1 is a partial cross sectional view of the optical recording medium according to an embodiment of the present invention.

The medium of the present invention has a recording layer including a phase change layer and a functional layer. The phase change layer contains a phase change material, and the functional layer is provided in contact with the phase change layer. The functional layer does not react with the phase change layer at a temperature near the crystallization temperature of the phase change layer, and reacts with the phase change layer at a temperature higher than the melting temperature of the phase change layer to produce the reaction product.

The medium of the present invention is recorded by the recording methods as described below.

In the first recording method, the as-deposited phase change layer which is amorphous is irradiated with a single laser beam with its intensity modulated at least between high power level and low power level. In the area irradiated with the laser beam of high power, the phase change layer and the functional layer react to produce the reaction product, whereas the amorphous phase change layer crystallizes in the area irradiated with the laser beam of low power level. After the recording, the record marks comprising the reaction product is present in the laminate of the crystallized phase change layer and the functional layer which did not react.

In the second recording method, entire surface of the as-deposited phase change layer which is amorphous is crystallized (initialized). Next, a single laser beam is irradiated with its intensity modulated to thereby react the phase change layer and the functional layer and produce the reaction product. In the second recording method, the intensity modulation pattern of the recording laser beam is not limited. The recording laser beam may be such that the laser beam is completely "off" in the area other than the area where record marks are to be formed, such that the phase change layer is irradiated with the beam of the power that does not affect the crystalline state of the phase change layer, or such that the phase change layer will undergo recrystallization. In this case too, the record marks comprising the reaction product will be present in the laminate of the crystalline phase change layer and the functional layer.

In the present invention, the phase change layer is irradiated with the laser beam of high power level to thereby heat the phase change layer to a temperature equal to or higher than the melting of the phase change layer, and the phase change layer is thereafter quenched. Through this process, the phase change layer and the functional layer react as soon as the melting of the phase change layer, and the reaction product is thereby produced. This reaction product does not undergo change in its reflectivity when the phase change layer is heated to its crystallization temperature. In other words, this reaction product is thermally more stable than the amorphous area of the phase change layer. On the other hand, in the area irradiated with the laser beam of low power level in the first recording method, the amorphous phase change layer is heated to a temperature equal to or higher than the crystallization temperature and less than the melting point, and the irradiated area is thereby crystallized. In this area, the phase change layer crystallizes without undergoing the reaction with the functional layer. Since the record marks comprising the reaction product are thermally stable as described above, such record marks enjoy excellent storage reliability as well as high durability in the reading. In addition, formation of the record marks comprising the reaction product is associated with substantially no selferase, and jitter is extremely low. The formation of such record marks is also associated with substantially no crosserase, and reduction in the recording track pitch, and hence, increase in the recording density is thereby enabled. As a consequence, a remarkable increase in the crystallization speed of the phase change layer is enabled in both the first recording method and the second recording method. In the first recording method, high speed recording is enabled since use of the phase change layer with a high crystallization speed is enabled. In the use of the second recording method, increase in the crystallization speed of the phase change layer enables smooth initialization at a high speed.

As described above, the amorphous phase of the as-deposited phase change layer is highly stable, and crystallization of the as-deposited phase change layer is quite difficult. While the as-deposited phase change layer shares the common feature that it is amorphous with the record marks of the typical phase change medium, the as-deposited phase change layer has much less crystal nuclei since, unlike the record marks, the as-deposited phase change layer is not surrounded by crystalline phase and, unlike the record marks formed by laser irradiation, the as-deposited phase change layer is relatively random in its structure due to its formation by vapor phase quenching. In spite of such situation, a phase change layer having a markedly high crystalline speed can be used in the present invention because the record marks of the present invention is highly stable irrespective of the crystallization speed of the phase change layer. Accordingly, the as-deposited phase change layer can be easily crystallized with the laser beam of low power level in the first recording method. Also, the crystallization of the as-deposited phase change layer can be further facilitated if the functional layer having a particular crystal structure is combined with the phase change layer which will be in a particular crystal structure after the crystallization.

The first recording method is associated with difficulty of tracking servo since the information is recorded on the amorphous phase change layer which has a low reflectivity. In order to facilitate the tracking servo, the functional layer may preferably have a higher reflectivity. When the reflectivity of the functional layer is high, amount of decrease in the reflectivity induced by the reaction between the functional layer and the phase change layer will be quite large, and signal output can be increased in both the first and the second recording methods compared to the case of the conventional phase change medium. It should be noted that the signal output is dependent on the difference in the reflectivity between the record marks and the crystalline area of the phase change layer, and a larger difference therebetween results in the higher signal output. In order to realize such high reflectivity, the functional layer may preferably have an extinction coefficient (imaginary part k of complex index of refraction n+ki) at the recording/reading wavelength of at least 1.5.

In the present invention, the medium can also be recorded by the third recording method as described below. In the third recording method, the phase change layer in its as-deposited state, namely, the phase change layer in the amorphous phase is irradiated with a single laser beam with its intensity modulated to thereby complete the crystallization of the phase change layer and the reaction between the phase change layer and the functional layer as in the case of the first recording method. However, triple-level recording is accomplished in this third recording method by utilizing the crystallized area of the phase change layer as the record marks in addition to the reaction product. In view of such situation, the intensity of the recording laser beam is modulated such that the laser beam is completely "off" in the area other than the area where record marks are to be formed, or such that the phase change layer is irradiated with the beam of the power that does not affect the crystalline state of the phase change layer, so that the phase change layer other than the area where record marks have been formed is maintained amorphous. As a consequence, first record marks comprising the reaction product and second record marks comprising the materials of the crystalline phase change layer will be present in the laminate of the amorphous phase change layer and the functional layer.

Use of a functional layer having a high reflectivity is also preferable in the third recording method. When the reflectivity of the medium is $R_{cry}$ in the crystalline area of the phase change layer, $R_{asd}$ in the amorphous area of the phase change layer, and $R_{rea}$ in the area where the reaction product has formed, and a functional layer having a high reflectivity is provided, the relation:

$$R_{cry} > R_{asd} > R_{rea}$$

can be met, and sufficiently large differences between these three reflectivities can be realized. The crystalline area of the phase change layer has a high reflectivity, and the functional layer of high reflectivity remains unreacted in such area, and therefore, the $R_{cry}$ is the highest of the three. On the other hand, in the area where the reaction product has formed, the laser beam is reflected by the reaction product having of low reflectivity, and the functional layer has undergone the reaction in such area, and therefore, the $R_{rea}$ is the lowest of the three. With regard to the amorphous area of the phase change layer which has a low reflectivity, the functional layer of high reflectivity is present in this area, and therefore, $R_{asd}$ is between the $R_{cry}$ and the $R_{rea}$. As described above, provision of the functional layer of high reflectivity having a high extinction coefficient enables triple-level recording at a sufficiently high signal output.

In the present invention, the functional layer is preferably formed as a crystalline layer comprising a metal. As will be described below, the phase change layer of the present invention preferably contains Sb and Te as its main components. With regard to a phase change layer containing Sb and Te as its main components, for example, the layer wherein the ratio of Sb to Te is 7 to 3, crystallization is known to take place predominantly from the boundary (for example, the boundary with the functional layer) unlike the case of the recording layer comprising a Ge—Sb—Te-based alloy, namely, the recording layer comprising $Ge_2Sb_2Te_5$ (Technical Digest of ODS2000 74–76). In such a case, if a functional layer in the form of a crystalline layer is present in contact with the phase change layer, crystallization of the phase change layer will be greatly promoted by the functional layer owing to the greater contact area between the phase change layer and the functional layer compared to the case when the functional layer is an amorphous layer owing to the coarser surface of the crystalline functional layer compared to the amorphous layer. Consequently, in the first recording method, high speed recording is enabled since the as-deposited phase change layer whose crystallization is difficult can be easily crystallized by irradiating a laser beam of low power level. In the use of the second recording method, promotion of the crystallization of the phase change layer enables smooth initialization at a high speed.

As described above, optical recording mediums have been known wherein a metal layer is provided in contact with the phase change layer. However, there has been no known medium like that of the present invention wherein a non-crystalline reaction product is formed through the reaction between the phase change layer and the metal layer (functional layer), and reflectivity of the medium has undergone a drastic change in the area where the reaction product had formed and such area where the reaction product had formed is used for the record marks, and these record marks exhibit markedly improved thermal stability.

Next, the medium of the present invention is described in detail by referring various parts thereof.

Structure Shown in FIG. 1

An embodiment of the optical recording medium of the present invention is shown in FIG. 1. This optical recording medium comprises a light-transmitting substrate 2, and a first dielectric layer 31, a recording layer 4, a second dielectric layer 32, a reflective layer 5, and a protective layer 6 deposited on the light-transmitting substrate 2 in this order. The laser beam for recording or reading enters the medium through the light-transmitting substrate 2.

Light-transmitting Substrate 2

The light-transmitting substrate 2 is transparent to the laser beam used for recording or reading. The thickness of the light-transmitting substrate 2 is generally in the range of 0.2 to 1.2 mm, and preferably, in the range of 0.4 to 1.2 mm, and the light-transmitting substrate 2 may typically comprise a resin, or alternatively, a glass. The grooves (guide grooves) 21 generally provided on the optical recording medium are the regions located closer to the side of the laser beam incidence and the raised regions defined between two adjacent grooves are the lands 22.

In the present invention, the lands and/or grooves may be used for the recording track. In the land/groove recording system wherein both the lands and the grooves are used as the recording track, cross erase wherein the record marks on the adjacent track are erased during the record mark formation is likely to take place. The present invention, however, is free from such cross erase as described above.

First Dielectric Layer 31 and Second Dielectric Layer 32

Figure 2:
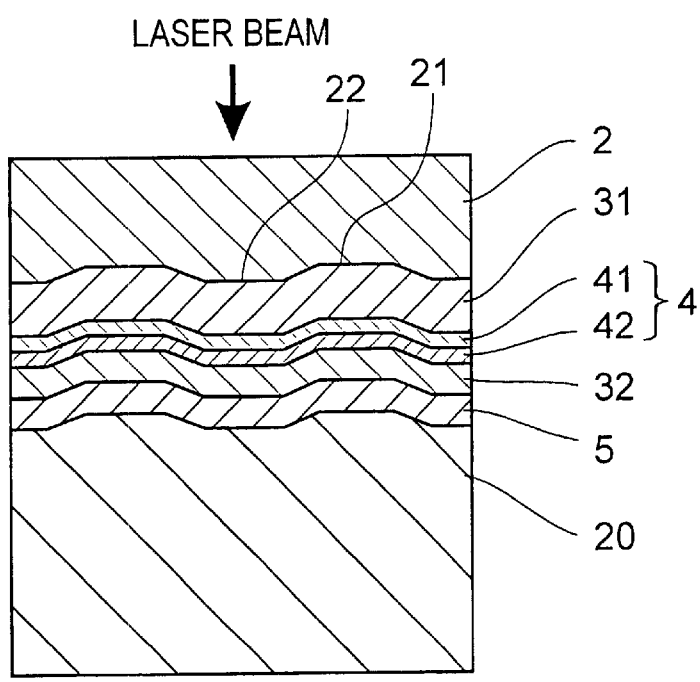
FIG. 2 is a partial cross sectional view of the optical recording medium according to another embodiment of the present invention.

These dielectric layers prevent oxidation and degradation of the recording layer 4, and also, protect the light-transmitting substrate 2 or the supporting substrate 20 shown in FIG. 2 from the heat transmitted from the recording layer during the recording by blocking the heat or by dissipating such heat in in-plane direction of the layer. Provision of the dielectric layers also contributes for improving the degree of modulation. Each dielectric layer may also comprise a laminate of two or more dielectric layers each having different compositions. The second dielectric layer may not be provided when no reflective layer is provided.

The dielectric material used for these dielectric layers is preferably a compound containing at least one metal component selected from Si, Ge, Zn, Al, and rare earth metals, and the material is preferably an oxide, a nitride, or a sulfide. A mixture containing two or more of the foregoing may also be used.

The thickness of the first and the second dielectric layers may be adequately determined so that sufficient improvement in the protection and degree of modulation are achieved. However, the first dielectric layer 31 is preferably deposited to a thickness of 10 to 300 nm, and the second dielectric layer 32 is preferably deposited to a thickness of 5 to 100 nm.

The dielectric layers are preferably formed by sputtering.

Recording Layer 4

The recording layer comprises at least one phase change layer and at least one functional layer which is in contact with the phase change layer. The recording layer 4 shown in the drawings comprises a phase change layer 41 and a functional layer 42.

The phase change layer 41 is not particularly limited for its composition, and the material used may be adequately selected from various phase change materials, and preferably, from those containing at least Sb and Te. However, crystallization temperature of the recording layer containing Sb and Te as the only components is as low as about 130° C., and the storage reliability is insufficient. For the increase in the crystallization temperature, the recording layer may preferably comprise elements other than Sb and Te. Such element is preferably at least one element selected from In, Ag, Au, Bi, Se, Al, P, Ge, H, Si, C, V, W, Ta, Zn, Ti, Sn, Pb, Pd, and rare earth elements (Sc, Y, and lanthanoids), and among these, the preferred is at least one element selected from rare earth elements, Ag, In, and Ge in view of the particularly high effect in improving the storage reliability.

As described above, the functional layer is preferably formed as a crystalline layer. The crystallization promoting effects of the crystalline functional layer is particularly notable when the phase change layer has a composition including Sb and Te as its main component but not in the case when composition is based on $Ge_2Sb_2Te_5$. Preferably, the composition containing Sb and Te as its main components is the one as described below.

Preferably, the composition containing Sb and Te as its main components is the one as described below, namely, the composition represented by the formula (I):

$$(Sb_xTe_{1-x})_{1-y}M_y \qquad (I)$$

wherein M represents the element other than Sb and Te, and atomic ratio of the elements constituting the phase change layer is preferably such that:

$$0.55 \leq x \leq 0.90,$$

and $$0 \leq y \leq 0.25.$$

and more preferably, $$0.55 \leq x \leq 0.85,$$

and $$0.01 \leq y \leq 0.20.$$

When x representing the content of Sb is too small in the formula (I), crystallization speed will be excessively low. In addition, when x is extremely low, recording will be difficult. On the other hand, when x is too large, difference in reflectivity between the crystalline phase and the amorphous phase will be insufficient.

The element M is not particularly limited. However, it is preferable to select at least one member from the above-indicated elements for the M in view of storage reliability. The y representing the content of the element M is preferably within the above-specified range since an excessively large y results in the reduced crystallization speed.

The phase change layer is preferably formed to a thickness of more than 4 nm to 50 nm, and more preferably, to a thickness of 5 nm to 30 nm. When the recording layer is too thin, growth of the crystalline phase will be difficult to render the crystallization difficult. When the recording layer is too thick, the recording layer will have an increased heat capacity to render the recording difficult. An excessively thick recording layer also results in the reduced output of output signal.

The phase change layers are preferably formed by sputtering.

Next, the functional layer is described.

The functional layer is a layer which should react with the phase change layer when the phase change layer is heated to a temperature equal to or higher than its melting point to form a reaction product. Therefore, the material used for the functional layer should be adequately selected depending on the material used for phase change layer. For example, when a phase change material containing Sb and Te as its main components as mentioned above is used, the material of the functional layer may preferably have a melting point of 400 to 1500° C., and more preferably 500 to 1200° C. Exemplary such materials include metals (simple substance or alloy) containing at least one of Al, Cu, Ag, and Ge. When the melting point of the material used for the functional layer is too low, the area of the phase change layer to be crystallized, namely, the area where the reaction between the phase change layer and the functional layer should not react becomes more susceptible to reaction, and use of such material is undesirable. On the other hand, when the material used for the functional layer has an excessively high melting point, the reaction between the phase change layer and the functional layer becomes less likely to take place. However, it is to be noted that, even if the melting point were within the preferable range as described above, the metal elements of Groups 15 (Vb) and 16 (VIb), and in particular, the elements (i.e. Sb, Bi and Te) which tends to react with the elements found in the phase change layer and the elements constituting the phase change layer are likely to react with the phase change layer at a relatively low temperature. Therefore, if the functional layer contains such elements, it will be difficult to promote only the crystallization of the phase change layer in the area irradiated with the laser beam of low power level without promoting any reaction. In other words, if the functional layer contains such elements, the composition of the phase change layer in the area to be crystallized will undergo change in its composition. In view of such situation, it is preferable to avoid use of such elements as the main components in the functional layer, and it is still more preferable to avoid inclusion of such elements in the functional layer.

Next, the constitution of the functional layer which is capable of promoting the crystallization of the phase change layer is described.

When the phase change layer of the present invention is a layer which, when it is crystallized, mainly comprises crystals of Fm3m structure or R3m structure, and more preferably solely from such crystals, and still more preferably from a single phase of either one of such crystals, and to be more specific, when the phase change layer is the one having the composition represented by formula (I) as described above, the crystallization is likely to take place such that the (111) face is substantially parallel to the in-plane direction of the layer. In such a case, the functional layer is preferably a layer which is crystalline in its as-deposited state, and at the same time, which mainly comprises crystals having Fm3m structure, and preferably from a single phase of such crystals, and more preferably from a single phase wherein (111) face, namely, the face of closest packing of the crystals having Fm3m structure extends in the direction parallel to the in-plane direction of the layer. When such functional layer is combined with the phase change layer as described above, the functional layer functions extremely well as the crystal nuclei for the crystallization of the phase change layer, and provision of the functional layer increases the crystallization speed more than twofold. Provision of the functional layer, therefore, is particularly effective for crystallization of the as-deposited phase change layer whose crystallization is difficult, and for facilitation of the crystallization of the phase change layer in the first recording method or the initialization of the phase change layer in the second recording method and speeding up of such crystallization or initialization. It should be noted that, although the matching of the crystal lattice of the functional layer with that of the phase change layer is favorable when the crystals constituting the functional layer have R3m structure as in the case of Sb and Bi, inclusion of such elements in the functional layer is undesirable since such elements are likely to react with the phase change layer.

In order to form a functional layer which mainly comprises crystals of Fm3m structure and which preferably comprises single phase of such crystals, the material used for the functional layer is preferably a metal (a simple substance or an alloy) which contains at least one metal element which has Fm3m structure at room temperature and which contains at least one of such metal elements as its main component, and the material used for the functional layer is most preferably the one which exhibits high crystallinity when the material is in the form of a thin film. Preferable examples of such metal elements include Al, Cu, and Ag. For the purpose of increasing the crystallinity, the content of the main components is preferably in the range of 60 to 100 atom %, and in particular, 80 to 100 atom %. When the content of the main components is too low, a functional layer with a high crystallinity is less likely to be formed, and the effects of promoting the crystallization of the phase change layer will be insufficient. The subsidiary components, namely, the components other than the main components are not limited, and may be any element other than those of the main components. However, use of the metal elements of Groups 15 (Vb) and 16 (VIb), and in particular, use of Sb, Bi, and Te is preferably to be avoided for the reason as described above.

The functional layer may preferably have a thickness of 1 to 40 nm, and more preferably, a thickness of 2 to 30 nm. When the functional layer is too thin, the reaction with the phase change layer required is not sufficiently promoted in terms of the scale of the reaction, and the reflectivity of the record marks comprising the reaction product will not be sufficiently reduced. The reflectivity of the functional layer will also become reduced and the difference in the reflectivity between the record marks and the area other than the record marks will be reduced. In addition, the functional layer will not sufficiently function as the crystallization nuclei. On the other hand, an excessively thick functional layer invites increase in the heat capacity of the functional layer rendering the recording difficult.

As described above, the functional layer may preferably have a high reflectivity, and to be more specific, the extinction coefficient at the recording/reading wavelength is preferably at least 1.5, and more preferably at least 2.0. Although there are no particular limitation for the extinction coefficient, the metal used for the functional layer normally has an extinction coefficient of not more than 10.

The material used for the functional layer may have a thermal conductivity of at least 0.03 W/cmK, and preferably at least 0.05 W/cmK as measured in thin film form of 100 nm thick. Accordingly, the semiconductor materials as described in JP-A 185289/1999, supra, can not be used for the functional layer of the present invention because of the insufficient thermal conductivity when the layer is formed in the form of a thin film. If the thermal conductivity of the material used for the functional layer is too low, accumulation of excess heat in the phase change layer is likely to take place during the crystallization of the phase change layer by heating of the laminate of the phase change layer and the functional layer. The accumulation of excess heat is most likely to take place when a laser beam of short wavelength is irradiated in an optical system having a large NA (numerical aperture) since energy density increases in the laser beam spot on the surface of the phase change layer. For example, when a relatively long region is to be crystallized in the first recording method as described above, an excessive heat may accumulate near the tail of the crystallization target region and the tail region may become amorphous, and in such case, the crystallized region of predetermined length is never provided. An excessively low thermal conductivity of the material used for the functional layer of the present invention may also invite an inconvenience in the initialization of the medium in the second recording method as described above. To be more specific, the initialization in the second method is typically accomplished by a bulk eraser which uses a laser beam of large diameter and there are some overlapping in the region irradiated by the laser beam. If the heat tends to accumulate in the phase change layer, the region of irradiation overlapping may become amorphous to fail to provide a normally initialized medium. On the other hand, the medium will experience decrease in the recording sensitivity when the material used for the functional layer has an excessively high thermal conductivity, and the material used for the functional layer may preferably have a thermal conductivity of not more than 5 W/cmK as measured in thin film form of 100 nm thick. The thermal conductivity of a thin film can be determined, for example, by calculation using Widemann-Franz law from the value of the electric resistance measured by four probe method.

The reaction product of the present invention is the product produced by mixing and/or reaction of the material constituting the phase change layer and the material constituting the functional layer. When observed under the transmission electron microscope, this reaction product is normally in amorphous phase, microcrystalline phase, or amorphous phase including microcrystals, and not in crystalline phase. When the reaction product is not crystalline, the optical reflectivity of the medium in the area wherein the reaction product has formed can be readily reduced to the level lower than the crystallized region of the phase change layer, and also, to the level lower than the amorphous area of the phase change layer.

The reaction product does not undergo phase change when it is heated to the crystallization temperature of the phase change layer, and no change is observed in the reflectivity. In other words, the record marks comprising the reaction product are thermally stable compared to the record marks formed by amorphizing the crystalline phase change layer or the as-deposited phase change layer which is amorphous. When the heating is continued to a higher temperature, it is most likely that the reaction product finally melts without undergoing any change. The reaction product, however, may also crystallize in its solid phase at a temperature lower than its melting point. The temperature at which the reaction product undergoes an optical change by melting or crystallization should be higher than the crystallization temperature ($T_{cry}$) of the phase change layer for the reason as described above, and preferably, at least 50° C. higher than the $T_{cry}$.

When the reaction product is formed by the reaction between the phase change layer and the functional layer, it is not necessary that the phase change layer and the functional layer react entirely in their thickness direction. In other words, it is acceptable that a part of the phase change layer and/or the functional layer remain unreacted after the reaction in thickness direction.

The embodiment shown in the drawings has the phase change layer 41 on the side of the laser beam incidence. The order of the phase change layer 41 and the functional layer 42 is not limited, and an embodiment wherein the functional layer 42 is formed on the side of the laser beam incidence is also acceptable.

The recording layer may comprise one phase change layer and one functional layer, or alternatively, the recording layer may have two or more layers of at least one of the phase change layer and the functional layer. When the recording layer comprises a total of three or more layers of the phase change and functional layers, the recording layer may comprise the same even number of alternately disposed phase change layers and functional layers, or an odd number of alternately disposed phase change and functional layers with the uppermost and the lowermost layers being the same type. The recording layer will become too thick when too many layers are disposed, and therefore, the number of interface between the phase change layer and the functional layer in the recording layer is preferably limited to up to 10.

When the recording layer has a multi-layer structure comprising two or more phase change layers, the adjacent two phase change layers can be thermally insulated by a functional layer. For example, when two phase change layers are provided with an intervening functional layer, the phase change layers on the side of the recording beam incidence can be crystallized while the other phase change layer remains amorphous if the power of the recording beam is adequately controlled. When the thus crystallized area is used as the first record mark, and both phase change layer are irradiated by a recording beam of higher power for crystallization of both layers and the thus crystallized area is used for the second record mark, and a recording beam of even higher power is used for formation of the reaction product which is used as the third record mark, four-level recording is enabled. Multilevel recording with an increased number of levels can be realized by increasing the number of phase change layers.

Reflective Layer 5

In the present invention, the reflective layer may be formed from any desired material, and typically, from a metal or a semimetal such as Al, Au, Ag, Pt, Cu, Ni, Cr, Ti or Si as a simple substance or as an alloy containing at least one of such metals.

The reflective layer is typically deposited to a thickness of 10 to 300 nm. The reflectivity is less likely to be sufficient when the thickness is below such range, and deposition to a thickness beyond such range is economically disadvantageous since no substantial improvement in the reflectivity is attained by additional increase in the thickness. The reflective layer is preferably formed by vapor deposition such as sputtering and evaporation.

It is to be noted that, when a functional layer having a relatively high reflectivity is provided, provision of the reflective layer 5 may not be necessary.

Protective Layer 6

The protective layer 6 is provided for improving scratch resistance and corrosion resistance. Preferably, the protective layer is formed of an organic material, and typically, a radiation curable compound or a composition thereof which has been cured with radiation such as electron or UV radiation. The protective layer may generally have a thickness of about 0.1 to about 100 $\mu$m, and may be formed by conventional techniques such as spin coating, gravure coating, spray coating, and dipping.

Structure Shown in FIG. 2

FIG. 2 shows an embodiment of the optical recording medium of the present invention. This medium comprises a supporting substrate 20, and a reflective layer 5 comprising a metal or a semimetal, a second dielectric layer 32, a recording layer 4, a first dielectric layer 31, and a light-transmitting substrate 2 deposited on the supporting substrate 20 in this order. The laser beam for recording or reading enters the medium through the light-transmitting substrate 2. It should be noted that an intermediate layer comprising a dielectric material may be optionally provided between the supporting substrate 20 and the reflective layer 5.

The light-transmitting substrate 2 of this embodiment may comprise a resin plate or a glass plate of the thickness substantially equivalent to that of the light-transmitting substrate 2 of FIG. 1. However, when the high recording density is to be attained by increasing the NA of the recording/reading optical system, reduction in the thickness of the light-transmitting substrate 2 is highly desired. The thickness of the light-transmitting substrate is preferably in the range of 30 to 300 $\mu$m. When the light-transmitting substrate is too thin, the medium will suffer from the optical influence of the dust on the surface of the light-transmitting substrate. An excessively thick light-transmitting substrate, on the other hand, will result in the difficulty of enabling the high density recording by increasing the NA.

The thin light-transmitting substrate 2 may be provided, for example, by bonding a light-transmitting sheet comprising a light-transmitting resin on the first dielectric layer 31 by means of an adhesive or a pressure-sensitive adhesive, or by directly forming the light-transmitting resin layer on the first dielectric layer 31 by coating.

The supporting substrate 20 is provided for the purpose of maintaining the rigidity of the medium. The thickness and the material used for the supporting substrate 20 may be the same as the one used for the light-transmitting substrate 2 in the embodiment of FIG. 1, and the supporting substrate 20 may be either transparent or non-transparent. The grooves 21 may be provided by transcription of the shape of the grooves formed on the supporting substrate 20 to the layers formed thereon as shown in the drawings.

Other layers are the same as those described for the embodiment of FIG. 1.

EXAMPLES

Example 1

Sample No. 1

A sample of the optical recording disk having the structure similar to FIG. 1 was produced by the procedure as described below except that no second dielectric layer 32 and no reflective layer 5 were formed.

A light-transmitting substrate 2 in the form of a land-and-groove double spiral disk having a diameter of 120 mm and a thickness of 0.6 mm was prepared by injection molding polycarbonate. Grooves were simultaneously formed in the injection molding of the light-transmitting substrate 2 to a width of 0.6 $\mu$m and a depth of 65 nm at a pitch of 1.2 $\mu$m.

The first dielectric layer 31 was formed by sputtering using ZnS and SiO$_2$ for the target at SiO$_2$/(ZnS+SiO$_2$) of 20 mole %. The first dielectric layer had a thickness of 100 nm.

The phase change layer 41 was an amorphous layer formed by sputtering to a thickness of 20 nm, and it had a composition in atomic ratio of:

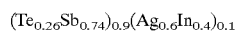

$(Te_{0.26}Sb_{0.74})_{0.9}(Ag_{0.6}In_{0.4})_{0.1}$

The functional layer 42 was a crystalline layer formed by sputtering to a thickness of 10 nm, and it had a composition in atomic ratio of Al$_{98}$Cr$_2$. The functional layer 42 had an extinction coefficient of 6.0 at a wavelength of 634 nm. An electron diffraction analysis revealed that the phase change layer after the crystallization was of rhombohedral system, namely, R3m structure, and the functional layer as-deposited was of face centered cubic lattice, namely, Fm3m structure. The functional layer also showed the tendency of the (111) face to orient in parallel to the in-plane direction of the layer. An Al$_{98}$Cr$_2$ layer having a thickness of 100 nm which had been formed under the same conditions as the functional layer was measured to have a thermal conductivity of 0.3 W/cmK.

The protective layer 6 was formed by spin coating a UV-curable resin and curing the coating by UV irradiation. The protective layer had a thickness of 5 µm.

Sample No. 1 was placed on an optical disk evaluator, and the grooves of the sample were irradiated with the laser beam at an output of 13 mW and a pulse width of 500 ns (duty ratio, 0.5) under the conditions:

linear velocity: 3.5 m/s, laser wavelength: 634 nm, and numerical aperture: 0.6 to thereby promote the reaction between the irradiated region of the phase change layer and the functional layer. When the reaction product formed was observed on a transmission electron microscope, the product was amorphous with no crystal structure.

Figure 3:
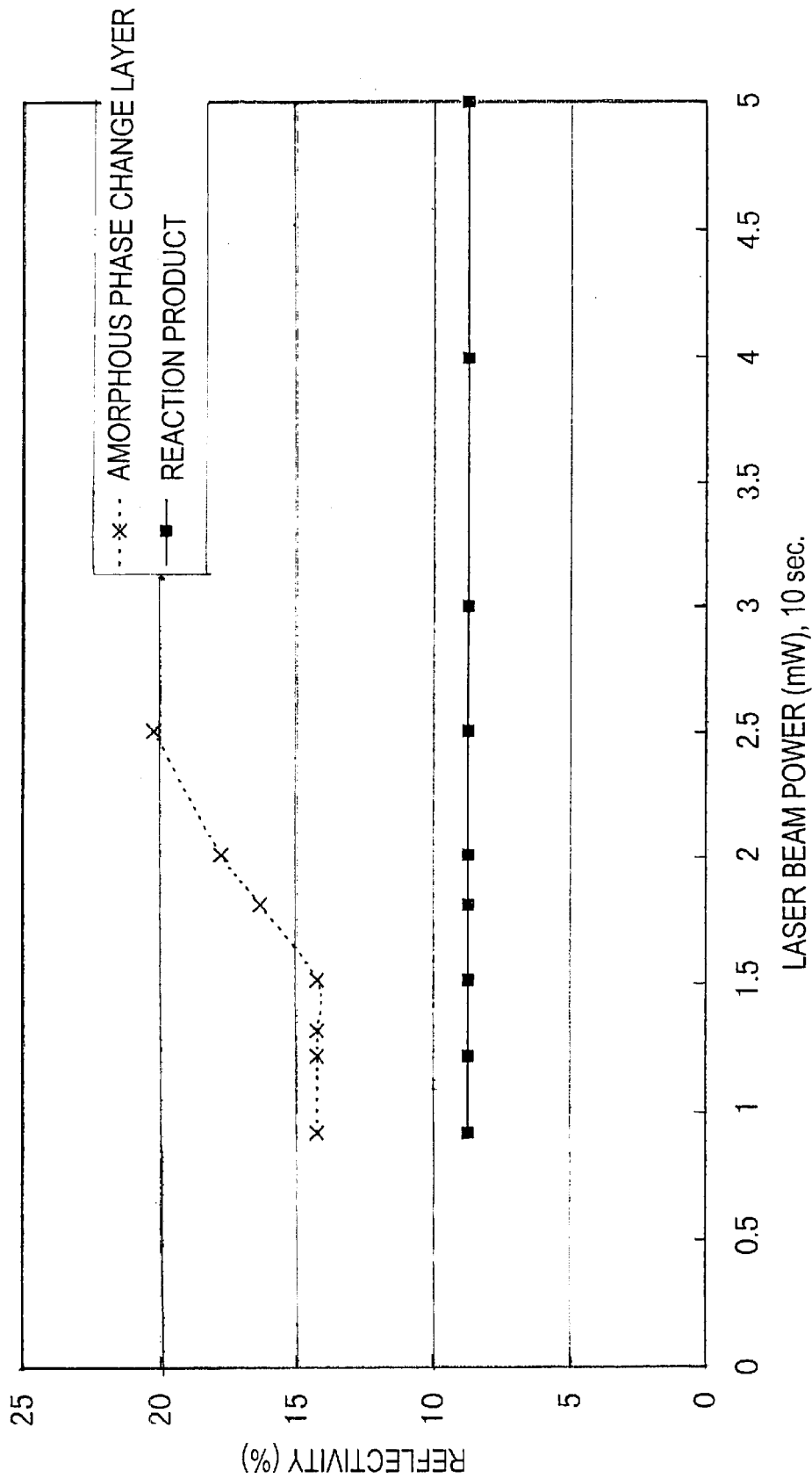
FIG. 3 is a graph showing the reflectivity of the medium in relation to the laser beam power.

The amorphous phase change layer and the reaction product of Sample No. 1 were evaluated for their durability in the reading. The sample was first irradiated with a reading laser beam of the power shown in FIG. 3 for 10 seconds, and amount of light reflected was measured by using a laser beam at the power of 0.9 mW for conversion into the reflectivity. The results are shown in FIG. 3. As seen from FIG. 3, the amorphous phase change layer became crystallized at the reading power of about 1.5 mW to undergo increase in the reflectivity whereas the reaction product exhibited no increase in the reflectivity even when the reading power was increased to the extent of 5 mW. In addition, the reflectivity of the amorphous phase change layer was relatively high, namely, about 15% whereas the reflectivity of the reaction product was as low as not more than 10% to realize a high signal output in the reading.

The phase change layer of Sample No. 1 was initialized by using a laser beam at an output of 5 mW at a linear velocity of 3.5 m/s, and then, the reaction product was formed under the conditions as described above. The reaction product was evaluated for its durability in reading under the conditions as described above, the results were substantially equivalent with the reaction product of FIG. 3. The initialization of the phase change layer could be accomplished at the output of 4 mW and the linear velocity of 3.5 m/s, and also, at the output of 5 mW and the linear velocity of 7 m/s.

Example 2

Sample No. 2

A sample of the optical recording disk having a structure similar to that of FIG. 1 was produced by the procedure as described below.

The light-transmitting substrate 2 was the same as that of Sample No. 1. The first dielectric layer 31 was the same as that of Sample No. 1 except for the thickness of 110 nm. The phase change layer 41 was the same as that of Sample No. 1. The functional layer 42 was the same as that of Sample No. 1 except for the thickness of 5 nm. The functional layer had a crystal structure the same as that of Sample No. 1. The second dielectric layer 32 was the same as the first dielectric layer 31 except for the thickness of 50 nm. The reflective layer 5 was a layer of $Al_{98}Cr_2$ (atomic ratio) with a thickness of 50 nm formed by sputtering. The protective layer 6 was the same as that of Sample No. 1.

Record marks comprising the reaction product were formed on Sample No. 2 by repeating the procedure of Sample No. 1 except that the laser beam used had an output of 12 mW, and the Sample No. 2 was evaluated for its durability in reading by the procedure as the one used for Sample No. 1. The results are shown in FIG. 4.

Figure 4:
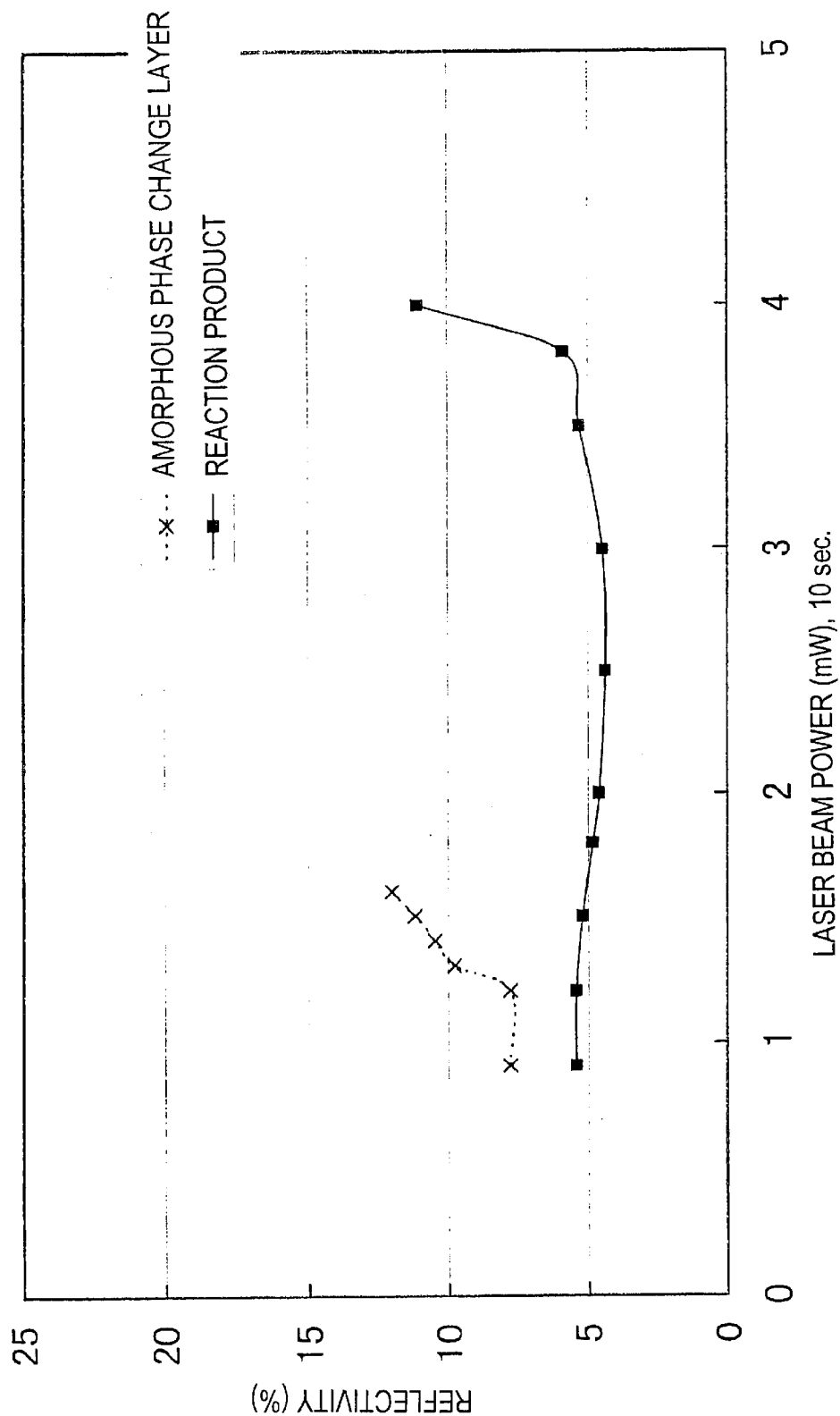
FIG. 4 is a graph showing the reflectivity of the medium in relation to the laser beam power.

FIG. 4 also indicates that the reaction product exhibits higher durability in reading as well as lower reflectivity compared to the amorphous phase change layer.

Sample No. 2g

Sample No. 2g for high temperature test was prepared by repeating the procedure of Sample No. 2 except that the light-transmitting substrate 2 used was a glass disk of 0.6 mm thick and no protective layer 6 was formed. The phase change layer of this sample was initialized on the optical disk evaluater as described above under the conditions including the laser power of 4 mW and linear velocity of 3.5 m/s. In this process, the area near the outer periphery of the phase change layer was left amorphous without initialization.

Next, record marks comprising the reaction product were formed on the recording layer by repeating the procedure of Sample No. 2, and the record marks were observed under a high temperature microscope at a heating rate of 10° C./min. No change in the state including that of the crystalline state was found in the record marks to the extent of the 250° C. On the other hand, the area near the outer periphery of the phase change layer which had been left uninitialized underwent complete crystallization when the temperature reached 180° C., and this area became undistinguishable from the initialized area (crystalline area).

The results indicate that changes in optical properties take place in the case of the record marks comprising the reaction product at a temperature 70° C. or more higher than that of the as-deposited amorphous phase change layer.

Comparative Example 1

Sample No. 3

A sample of the optical recording disk having a structure similar to that of FIG. 1 was produced by the procedure as described below except that the recording layer 4 had a single layer structure comprising the phase change layer 41.

The light-transmitting substrate 2 was the same as that of Sample No. 2. The first dielectric layer 31 was the same as that of Sample No. 2 except for the thickness of 80 nm. The phase change layer 41 was the same as that of Sample No. 2. The functional layer 42 was not provided. The second dielectric layer 32 was the same as that of Sample No. 2 except for the thickness of 20 nm. The reflective layer 5 was the same as that of Sample No. 2 except for the thickness of 100 nm. The protective layer 6 was the same as that of Sample No. 2.

The phase change layer (recording layer) of Sample No. 3 was initialized on the optical disk evaluater as described above under the conditions including a laser power of 5 mW and a linear velocity of 3.5 m/s. The phase change layer was then melted by irradiating the groove with a laser beam at an output of 14 mW and a pulse width of 500 ns (duty ratio, 0.5) followed by quenching to form record marks comprising an amorphous phase change material. The record mark formed as described above is referred in the present invention as a melt-quenched amorphous record mark.

Figure 5:
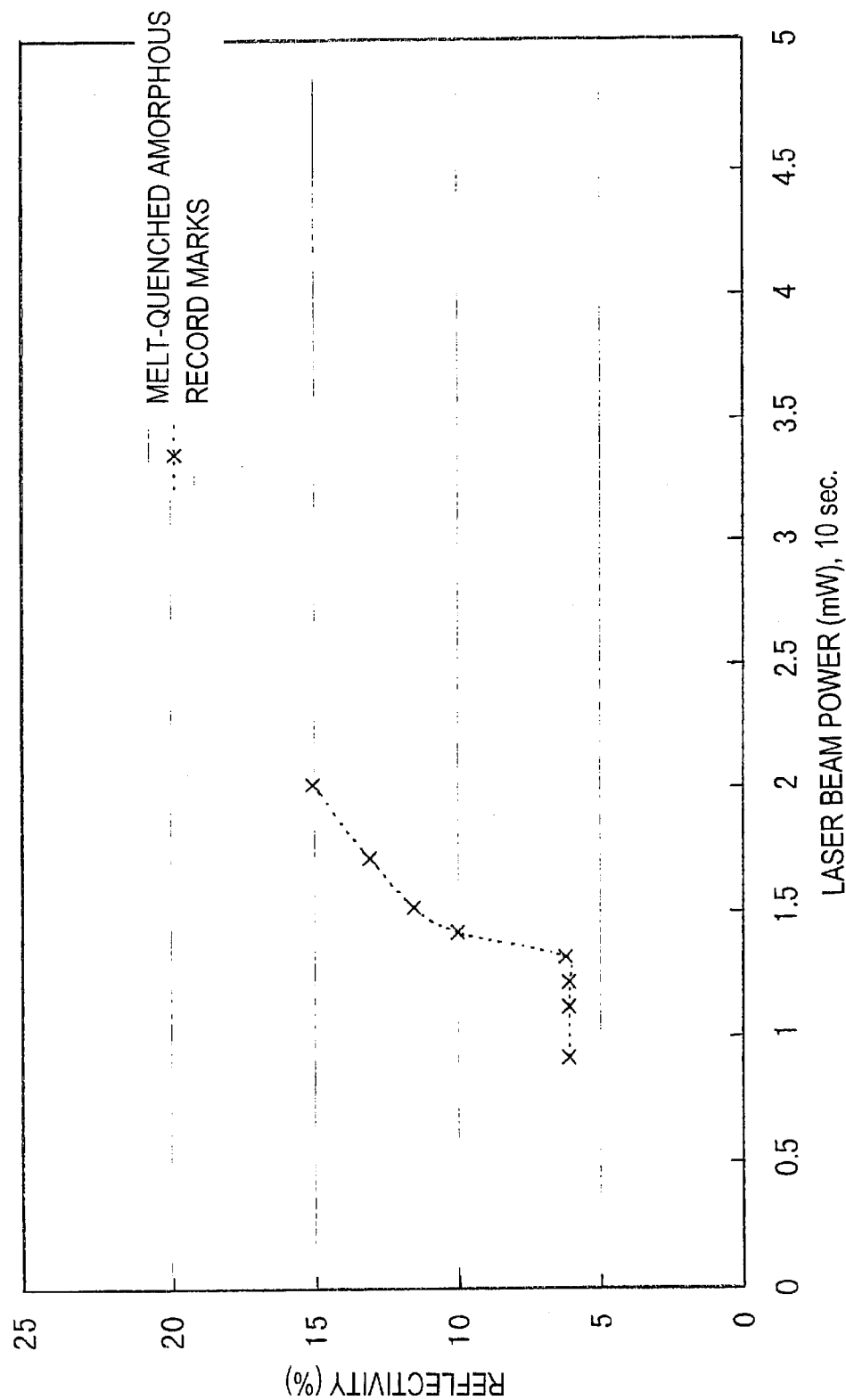
FIG. 5 is a graph showing the reflectivity of the medium in relation to the laser beam power.

The melt-quenched amorphous record marks formed on this sample were evaluated by repeating the procedure of Sample No. 1. The results are shown in FIG. 5. As seen from FIG. 5, the melt-quenched amorphous record marks exhibit an extremely low durability in reading as in the case of the amorphous phase change layer.

It should be noted that, in the Sample 1 as described above, initialization could be accomplished under the conditions of the output of 5 mW and the linear velocity of 3.5 m/s as in the case of this Sample No. 3. This indicates that the functional layer of Sample No. 1 has not undergone reaction with the phase change layer at the temperature near the crystallization temperature of the phase change layer.

In Sample No. 3, initialization could not be accomplished under the conditions of the output of 5 mW and the linear velocity of 7 m/s unlike the case of Sample No. 1. This indicates that crystallization of the phase change layer had been promoted by the provision of the functional layer.

Sample No. 3g

Sample No. 3g for high temperature test was prepared by repeating the procedure of Sample No. 3 except that the light-transmitting substrate 2 used was a glass disk of 0.6 mm thick and no protective layer 6 was formed. The phase change layer of this sample was initialized on the optical disk evaluater as described above under the conditions including the laser power of 5 mW and linear velocity of 3.5 m/s, and then, melt-quenched amorphous record marks were formed as in the case of Sample No. 3. When the record marks were observed under a high temperature microscope at a heating rate of 10° C./min, the record marks became completely crystallized when the temperature reached 160° C., and this area became undistinguishable from the initialized area (crystalline area).

Comparison between this Sample No. 3g with Sample No. 2g as described above indicates that changes in optical properties take place in the case of the Sample No. 2g comprising the reaction product at a temperature 90° C. or more higher than that of the melt-quenched amorphous record marks of the conventional phase change medium.

Example 3

Figure 6:
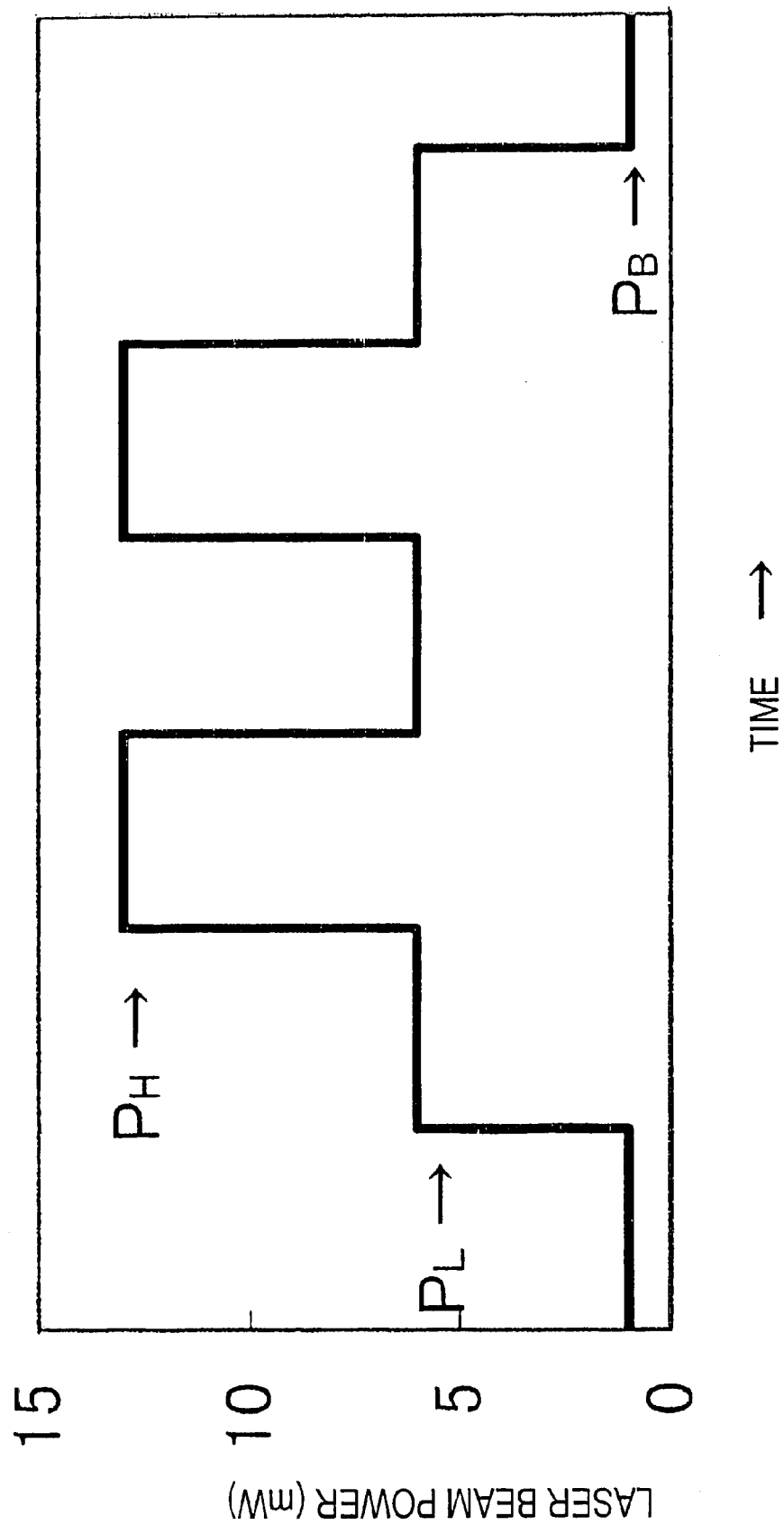
FIG. 6 is a graph showing pulse modulation pattern of the laser beam used for recording.

Sample No. 1 was recorded on the optical disk evaluater as described above at a relative linear velocity of 7 m/s by using a laser beam which is pulse-modulated as shown in FIG. 6 between three power levels, namely, bias power level $P_B$, high power level $P_H$, and low power level $P_L$. Irradiation at each power level was continued for a time so that irradiation length at each power level was 1.87 μm.

Figure 7:
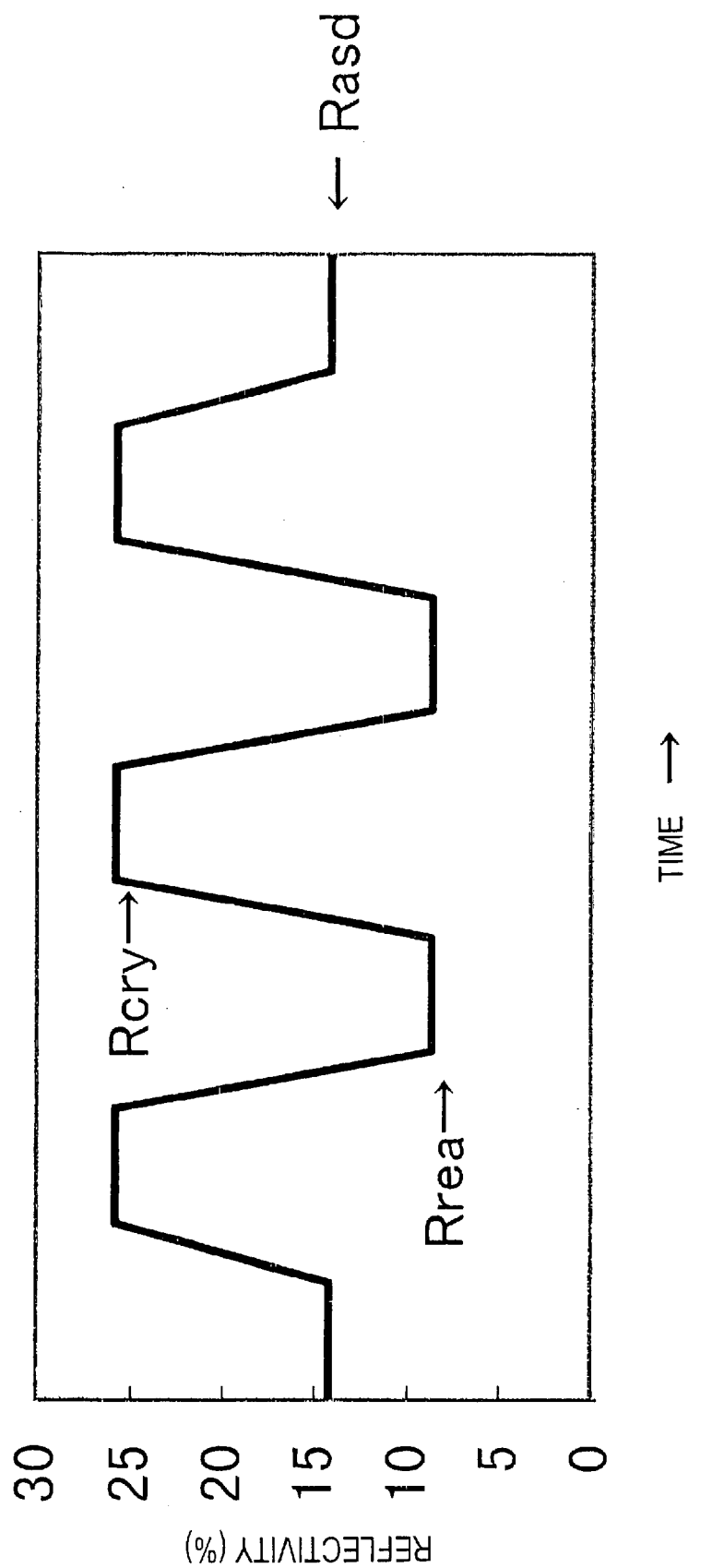
FIG. 7 is a graph showing the reflectivity of the medium over time which corresponds to the pulse modulation pattern of FIG. 6.

The sample recorded with the signal was measured for the amount of reflected light to find progression of reflectivity over time. The results are shown in FIG. 7. The progression of reflectivity over time shown in FIG. 7 corresponds to the pulse modulation pattern of FIG. 6. In FIG. 7, the highest reflectivity $R_{cry}$ is the reflectivity of the area irradiated with the laser beam of low power level $P_L$ where the phase change layer had crystallized and the functional layer underwent no change, whereas the lowest reflectivity $R_{rea}$ is the reflectivity of the area irradiated with the laser beam of high power level $P_H$ where the phase change layer and the functional layer had reacted to form the amorphous reaction product. $R_{asd}$ between the $R_{cry}$ and $R_{rea}$ is the reflectivity of the area irradiated with the laser beam of bias power $P_B$ where neither the phase change layer nor the functional layer underwent any change and the phase change layer remained amorphous as was the as-deposited phase change layer.

In FIG. 7, the relation:

$$R_{cry} > R_{asd} > R_{rea}$$

is satisfied. While difference in the reflectivity between the amorphous area and the crystalline area in the phase change layer is utilized in the phase change layer of conventional type, the present invention has enabled to use the difference in the reflectivity between the area where the reaction product is present and the crystalline area, i.e. ($R_{cry} - R_{rea}$) by providing the functional layer, and this has enabled to increase the output of the signal in the reading.

Furthermore, FIG. 7 indicates that there are sufficient difference not only between $R_{cry}$ and $R_{asd}$ but also between $R_{asd}$ and $R_{rea}$, and this indicates that the medium of the present invention can be used as a medium of triple-level recording.

Merits of the Invention

In the present invention, a functional layer which reacts with the phase change layer at a temperature higher than the melting point of the phase change layer and whereby a reaction product is produced by such reaction is provided in contact with the phase change layer so that record marks comprising the reaction product are formed. Accordingly, the optical recording medium has excellent durability in reading as well as high storage stability, and the medium is substantially free from self erase and cross erase.

Japanese Patent Application No. 303673/2000 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical recording medium comprising a recording layer including at least one phase change layer which can undergo amorphous-crystalline conversion and at least one functional layer provided in contact with the phase change layer, wherein the recording layer as an as-deposited layer is amorphous, the functional layer includes a component which reacts with a component of the phase change layer to produce a reaction product when the phase change layer is heated to a temperature equal to or higher than the melting point of the phase change layer, the reaction product changes optical reflectivity in an area where the reaction product is formed, and the optical reflectivity thus changed is maintained even if the area is heated to the crystallization temperature of the phase change layer.

2. An optical recording medium according to claim 1, wherein:

said reaction product is not crystalline;

the area is decreased in the optical reflectivity; and the optical reflectivity thus decreased is maintained even if the area is heated to the crystallization temperature of the phase change layer.

3. An optical recording medium according to claim 1, wherein the functional layer has an extinction coefficient at the recording/reading wavelength of at least 1.5.

4. An optical recording medium according to claim 1, wherein said functional layer is a crystalline layer.

5. An optical recording medium according to claim 1, wherein the relation:

$$R_{cry} > R_{asd} > R_{rea}$$

is satisfied when the reflectivity of the medium is $R_{cry}$ in the crystalline area of the phase change layer; $R_{asd}$ in the amorphous area of the phase change layer; and $R_{rea}$ in the area where the reaction product has formed.

6. An optical recording method for recording the optical recording medium of claim 1, wherein the recording layer including the phase change layer in amorphous state is irradiated with a laser beam of modulated intensity so that record marks comprising the reaction product are formed, and so that at the same time, the phase change layer becomes crystallized in the area other than the record marks.

7. An optical recording method for recording the optical recording medium of claim 1, wherein the recording layer including the phase change layer in crystalline state is irradiated with a laser beam of modulated intensity so that record marks comprising the reaction product are formed, and so that at the same time, the phase change layer is maintained in its crystalline state in the area other than the record marks.

8. An optical recording method for recording the optical recording medium of claim 1, wherein the recording layer including the phase change layer in amorphous state is irradiated with a laser beam of modulated intensity so that first record marks comprising the reaction product are formed, and at the same time, second record marks are formed by crystallization of the phase change layer, and the phase change layer is maintained in its amorphous state in the area other than the first and the second record marks.

9. An optical recording medium according to claim 1, wherein the component of the recording layer comprises at least Sb and Te.

10. An optical recording medium according to claim 9, wherein:

the component of the recording layer comprises a composition represented by the formula:

$$(Sb_xTe_{1-x})_{1-y}M_y;$$

and the M is at least one element selected from the group consisting of In, Ag, Au, Bi, Se, Al, P, Ge, H, Si, C, V, W, Ta, Zn, Ti, Sn, Pb, Pd, and a rare earth element.

11. An optical recording medium according to claim 10, wherein:

$$0.55 \leq x \leq 0.90;$$

and $$0 \leq y \leq 0.25.$$

12. An optical recording medium according to claim 1, wherein the functional layer mainly comprises crystals having Fm3m structure whose (111) face extends in a direction parallel to an in-plane direction of the functional layer.

13. An optical recording medium according to claim 1, wherein the component in the functional layer comprises at least one element selected from the group consisting of Al, Cu, Ag and Ge.

* * * * *